Nov. 16, 1954
L. J. MAYER
2,694,219
POULTRY TENDON PULLER
Filed May 17, 1952
3 Sheets-Sheet 1
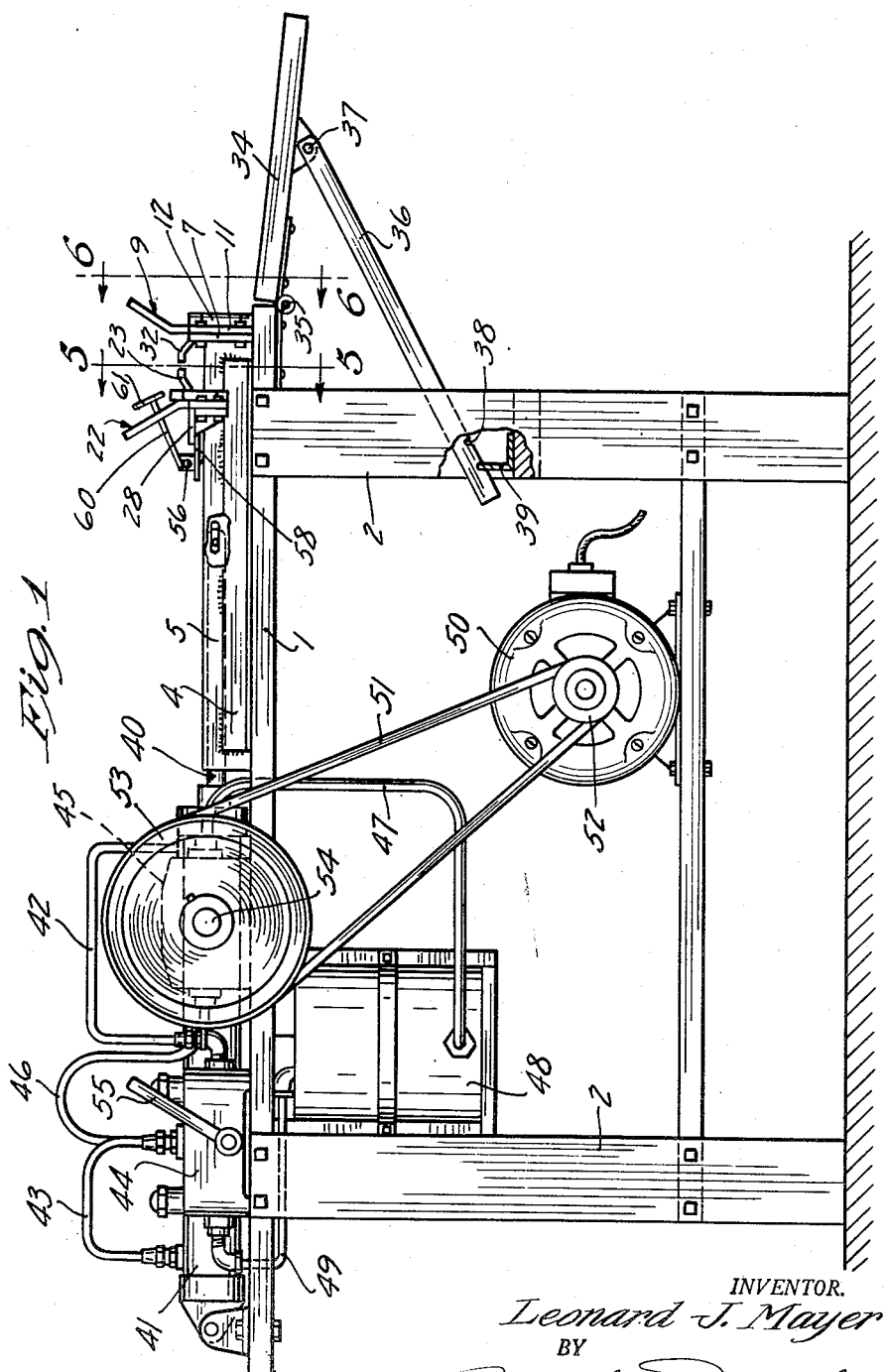
INVENTOR.
Leonard J. Mayer
BY
Merchant & Merchant
ATTORNEYS Nov. 16, 1954     L. J. MAYER     2,694,219
POULTRY TENDON PULLER
Filed May 17, 1952     3 Sheets-Sheet 2
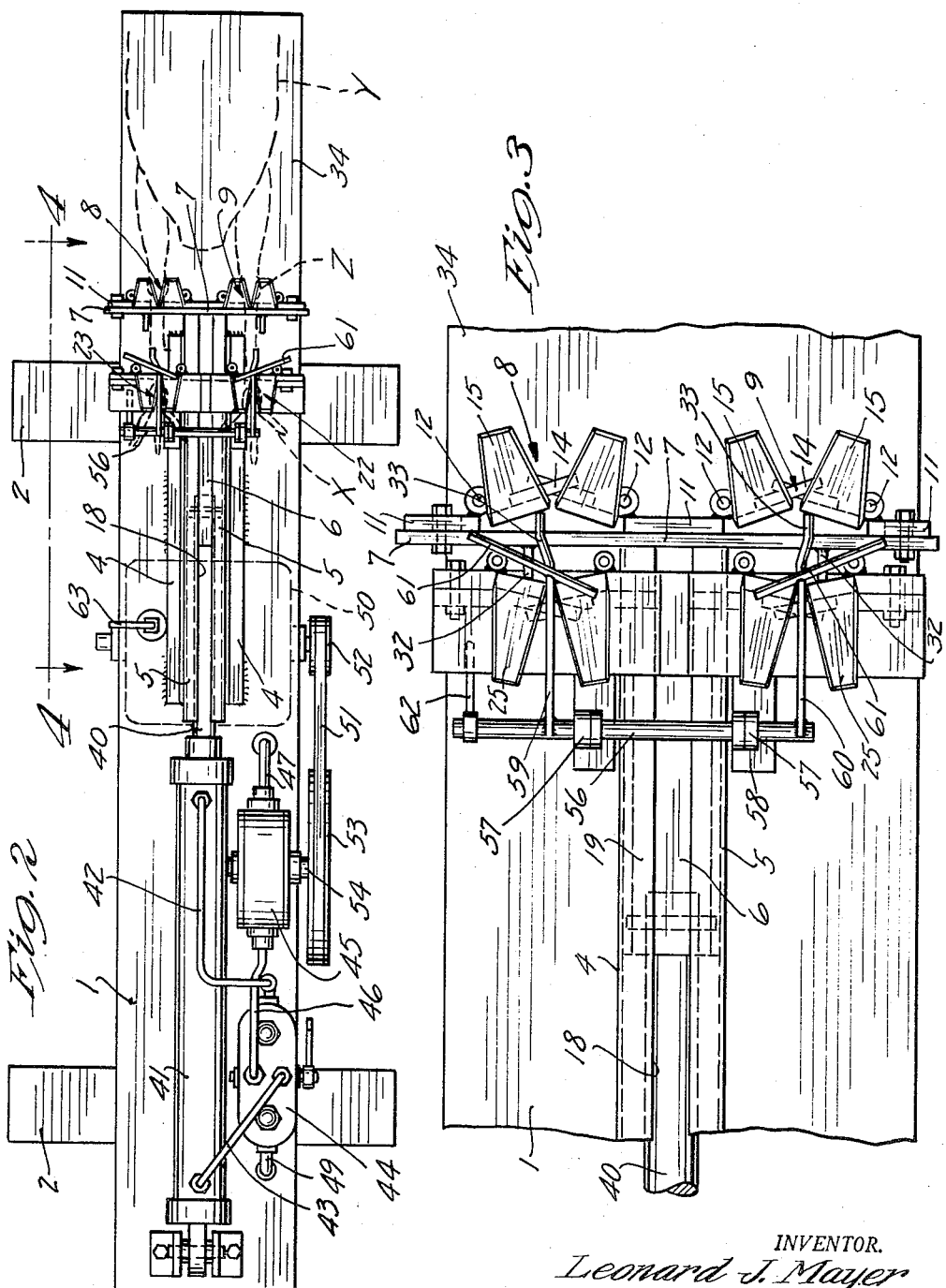
INVENTOR.
Leonard J. Mayer
BY
Merchant & Merchant
ATTORNEYS Nov. 16, 1954 L. J. MAYER 2,694,219
POULTRY TENDON PULLER
Filed May 17, 1952 3 Sheets-Sheet 3
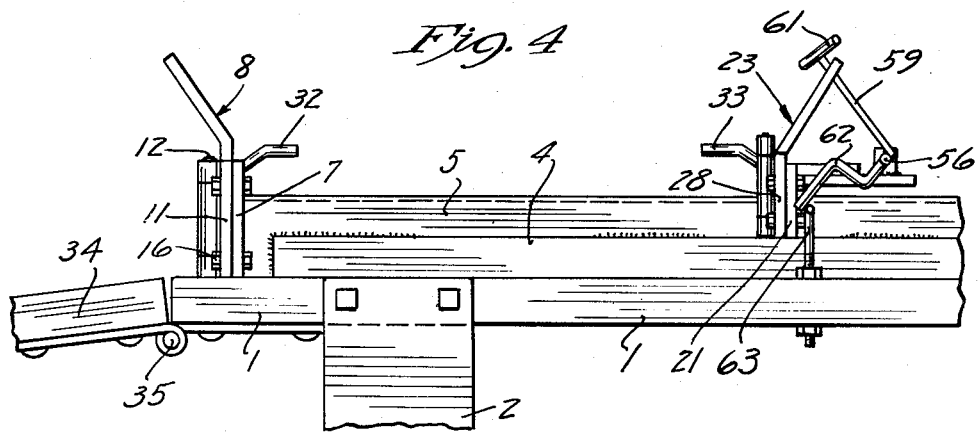
Fig. 4
Fig. 5
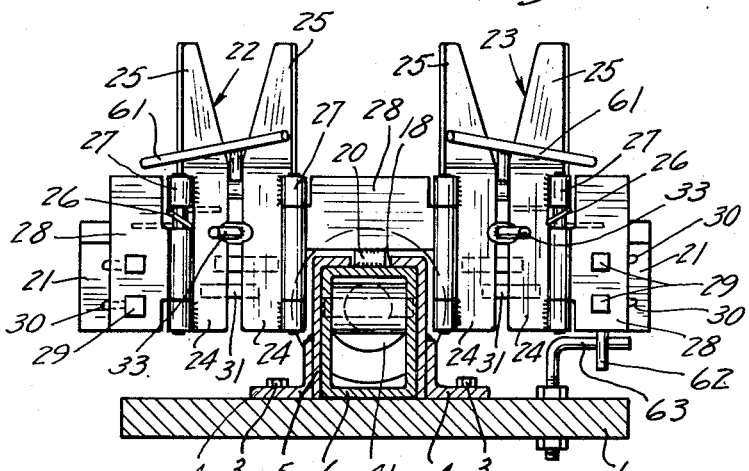
Fig. 6
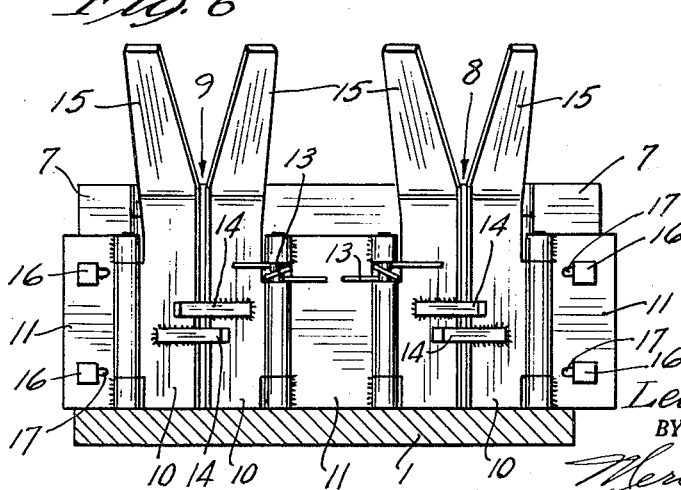
INVENTOR.
Leonard J. Mayer
BY
Merchant & Merchant
ATTORNEYS

United States Patent Office 2,694,219
Patented Nov. 16, 1954

2,694,219

POULTRY TENDON PULLER

Leonard J. Mayer, Frazee, Minn.

Application May 17, 1952, Serial No. 288,446

11 Claims. (Cl. 17—11.3)

My invention relates to devices for drawing out the tendons from the fleshy part of the legs of turkeys and other poultry.

The primary object of my invention is the provision of a power-operated machine for the above purpose, which is extremely easy to operate and which is completely fool-proof and positive in its action.

A still further object of my invention is the provision of a device having cooperating pairs of opposed jaws for the reception of the enlarged feet and knee joints of a turkey or other fowl—which jaws are automatically placed in an open joint-receiving position when same are in closely-spaced relation, and which will exert a tighter grip upon the leg portions inserted therebetween as the jaws are separated under power.

A still further object of my invention is the provision of a device of the class described which includes a pair of fixed jaws and a pair of movable jaws mounted for reciprocal sliding movements with respect to the fixed jaws, and in which the movable jaws are provided with means for automatically ejecting the legs and tendons carried thereby (after pulling same free from a given fowl), when the movable jaws have approached the limit of their movement in one direction—whereby said jaws will be in free and clean condition to receive the legs of the next fowl when they are moved to their limit in the opposite direction.

The above and other numerous and important objects and advantages of my invention will become apparent from the following detailed specification, appended claims and attached drawings.

Referring to the drawings, wherein like characters indicate like parts throughout the several views:

Fig. 1 is a view in side elevation, some parts being broken away and shown in section.

Fig. 2 is a view in plan of the structure of Fig. 1.

Fig. 3 is an enlarged fragmentary detail of a portion of Fig. 2, showing a different position of some of the parts.

Fig. 4 is an enlarged view in side elevation as seen from the line 4—4 of Fig. 2, showing a different position of some of the parts.

Fig. 5 is an enlarged transverse section taken substantially on the line 5—5 of Fig. 1.

Fig. 6 is an enlarged view partly in end elevation and partly in transverse section, taken on the line 6—6 of Fig. 1.

Referring with greater particularity to the drawings, the numeral 1 indicates a base plate, preferably, and as shown, mounted on a suitable leg-equipped supporting frame indicated in its entirely by the numeral 2. Rigidly secured to the base plate 1, such as by means of bolts 3 (see Fig. 5), passing through anchoring feet 4, is an elongated upstanding guide 5. As shown, the guide 5 is tubular in shape for the reception therein of a slide 6, which will hereinafter be described in greater detail. Guide 5 terminates at its forward end adjacent the forward end of the base plate 1, and is there provided with a transversely-extending upstanding mounting plate 7. Gate-acting clamping devices 8 and 9, each including cooperating clamping jaws 10, are secured to the forward face of the mounting plate 7 through the medium of laterally-spaced mounting brackets 11, one each adjacent the opposite ends thereof and one in the center thereof. As shown, vertical hinges 12 are secured between the opposed edges of the mounting brackets 11 and the clamping jaws 10. Torsion springs 13 bias one of the clamping jaws of each cooperating pair toward a gate-closed position in engagement with the mounting plate 7, the portions of which, between the hinges 12 of each pair thereof provides stop means for said jaws. On the other hand, laterally-projecting fingers 14, one each carried by the clamping jaws 10, and which overlap the free edge of opposite clamping jaws 10, cause both of said clamping jaws 10 to open when either one thereof is opened, and close when either one thereof is closed under bias of springs 13. Preferably, and as shown, the clamping jaws 10 are formed from flat metal stock, and their ends 15 are bent forwardly roughly 45 degrees from the vertical. As shown, the adjacent side edges of said jaw portions 15 diverge from approximately the level of the upper edge of the mounting plate 7 to define a V-shaped clamping fork when said clamping jaws 10 are in the closed position indicated in Fig. 6. As there shown, the free edges of the clamping jaws 10 are in approximately abutting relationship. However, the precise spacing may be varied considerably by loosening the nut-equipped bolts 16 which extend through the outermost mounting brackets 11 and the mounting plate 7. Note that the slots 17 in the former, through which the bolts 16 extend, make this adjustment possible.

Referring to Figs. 3 and 5, it will be noted that the guide 5 is provided with an elongated slot 18 along its upper surface 19. Rigidly secured to the forward end of the slide 6 within the guide 5, and projecting upwardly through said slot 18 is a neck 20 to which is in turn secured a mounting plate 21 which is parallel to the upstanding mounting plate 7. It will be noted that the clamping devices 8 and 9 are on opposite sides of the plane of the guide 5. Similarly mounted on the mounting plate 21 are a pair of laterally-spaced clamping devices 22 and 23, one on each side of slide 6— the clamping device 22 being in alignment with clamping device 8, and clamping device 23 being in alignment with clamping device 9. Clamping devices 22 and 23 are in all respects similar to clamping devices 8 and 9, except that clamping jaws 24 open in the opposite direction from clamping jaws 10 and the upstanding clamping jaw portions 25 are likewise bent in the opposite direction from the portions 15. Note that the torsion springs 26 bias the jaws 24 into engagement with the mounting plate 21; whereas, the vertical hinges 27 are interposed between opposed edges of the mounting bracket 28. Note also that nut-equipped bolts 29 pass through the mounting brackets 28 and through transverse slots 30 in the mounting plate 21, whereby to permit lateral adjustment of one of the clamping jaws 24 with respect to the other. Likewise, clamping jaws 24 are provided with laterally projecting fingers 31 which overlap the cooperating jaws 24—thus assuring simultaneous opening and closing movements of one thereof when the other thereof is caused to be opened or closed.

To assure positive but automatic open swinging movements of the clamping jaws 10 and 24, I provide pairs of push rods 32 and 33, located respectively on the mounting plates 7 and 21, and projecting toward each other but laterally staggered with respect to each other, whereby the push rods 32 will come into engagement with one of the clamping jaws 24, and push rods 33 will come into engagement with one of the clamping jaws 10 when the slide 6 reaches the end of its advancing stroke, whereby to place the opposed clamping devices 8 and 22 and 9 and 23, respectively, into closely-spaced relationship, see particularly Fig. 3. It is in this position that the legs of the turkey, or other poultry, are clamped firmly between the open clamping jaws 15 and 25, the feet X of the bird Y being placed under the jaw portions 25, and the legs immediately adjacent the knee joint Z being positioned between the clamping jaw members 15, as shown in Fig. 2. To receive the body of the bird I provide a shelf 34. Note that the shelf 34 is hinged to base 1 at 35 for swinging movements from horizontal to an inclined position—support therefor being achieved through the medium of an arm 36 pivoted as at 37 to the shelf 34, and having longitudinally-spaced notches 38 adjacent its free outer end for selective reception into the upper edge of flange 39. When a bird has been clamped within the cooperating clamping jaws 10 and 24, respectively, as above described, retracting movements are imparted to the slide 6 and the jaws 24 by means of a fluid pressure-operated plunger 40 secured to a piston, not shown, within the hydraulic cylinder 41. Fluid under pressure is introduced into opposite ends of the cylinder 41 to impart reciprocal movements to the plunger 40 and slide 6 through the medium of conduits 42 and 43, respectively, which are connected at their inner ends to a conventional reversing valve 44, which in turn is coupled to a pump 45 through conduit 46. As shown particularly in Fig. 1, a conduit 47 leads from a fluid reservoir 48 to the intake of the pump 45; whereas, the conduit 49 extends from the reversing valve 44 to the reservoir 48. A conventional electric motor 50 is mounted on the base frame 2 and has a V-belt or the like 51 which runs between the sheave 52 thereof and the sheave 53 on the shaft 54 of pump 45—all in a conventional manner. Handle 55 on the reversing valve 44 may be manipulated to cause the slide 6 and clamping jaws 24 associated therewith to move from the advanced clamping position of Fig. 3 to the retracted leg and sinew-extracting position of Fig. 4.

As the slide 6, with its cooperating pairs of clamping jaws 24 associated therewith, is moved away from the stationary clamping jaws 15 on the base 1, the entire lower part of the leg of the fowl below the knee Z is removed, together with the tendons, from the upper portion of the leg. It will be noted that the greater the retracting force exerted upon the slide 6, the greater the clamping action exerted by the clamping jaws 15 and 24 respectively, as said jaws are pushed to their closed clamping positions against the mounting plates 7 and 21, respectively. For the purpose of automatically ejecting or throwing out the legs and tendons securely clamped between the jaws 24 on the slide 6, as they approach the end of their retracting stroke, I provide a horizontal rock shaft 56 mounted in upstanding bearing brackets 57, one on each side of the guide 5. As shown, the bearing brackets 57 are rigidly secured to mounting members 58 projecting rearwardly from mounting plate 21. Rock shaft 56 is provided with a pair of rocker arms 59 and 60, laterally spaced from each other and receivable one each between a pair of clamping jaws 24 under the action of gravity. Preferably, and as shown, rocker arms 59 and 60 extend forwardly beyond the jaws 24 when in a closed position and at their free ends are provided with T-shaped cross heads 61, which are adapted to underlie the leg of the fowl between the foot X and the knee joint Z.

Depending from rock shaft 56 is an actuator arm 62. Secured to the base and upstanding therefrom in the path of travel of the actuator arm 62 so as to be intercepted thereby as the slide 6 approaches the end of its retracting stroke, shown in Fig. 4, is a cam element 63. Actuator arm 62 never passes over the cam element 63, but merely rides thereon, as shown in Fig. 4, sufficiently to elevate the rocker arm 59 and throw-out head 61 to the position there shown, thus completely removing the extracted leg and other material clamped between the jaws 24.

While I have described a preferred embodiment of my novel device, it is obvious that the same is capable of considerable modification without departure from the spirit and scope of the invention, as defined by the appended claims.

What I claim is:
1. In a poultry tendon-pulling machine, a mounting base, an upstanding fork-like leg engaging and clamping device secured to said base, a slide, guide means mounting said slide on said base for reciprocal leg separating and tendon pulling movements away from and return movements toward said clamping device, a second fork-like leg engaging and clamping device carried by said slide and aligned with the clamping device on said base, one of said clamping devices comprising clamping jaws which are hingedly mounted adjacent their outer edges on parallel axes for gate-like swinging movements of their free edges from a closed leg clamping position to an open leg releasing position in a direction away from the other of said clamping devices, and stop means limiting movement of said gate-like clamping jaws in a gate closed direction.

2. The structure defined in claim 1 in which one of said clamping jaws of one of said clamping devices is laterally adjustable with respect to its cooperating clamping jaw whereby to vary the distance between the free clamping edges thereof.

3. The structure defined in claim 1 in which the hingedly mounted clamping jaws are carried by said slide, and in further combination with cam-actuated throw-out means associated with said jaws operative to automatically remove the severed leg portions with the tendons thereof from said clamping jaws when said slide is moved a predetermined distance away from the clamping device on said base.

4. The structure defined in claim 3 in which each of said clamping jaws is provided with means for causing opening movements to be imparted thereto when the other cooperating jaw is opened, and in further combination with means for imparting opening swinging movements to said clamping jaws when same are brought into closely-spaced relationship with the clamping device on said base, said last-mentioned means comprising a pusher element mounted for common movements with said slide and engageable with one of the jaws of said clamping device.

5. In a poultry tendon-pulling machine, a mounting base, a pair of laterally-spaced upstanding fork-like leg engaging, and clamping devices secured to said base, a slide, guide means mounting said slide on said base for reciprocal leg separating and tendon pulling movements away from and return movements toward said clamping device, a second pair of fork-like leg engaging and clamping devices carried by said slide and aligned with the clamping devices on said base, each clamping device of one of said pairs comprising clamping jaws which are hingedly mounted adjacent their outer edges on parallel axes for gate-like swinging movements of their free edges from a closed leg clamping position to an open leg releasing position in a direction away from the other pair of clamping devices, stop means limiting movements of said clamping jaws in the direction of said other pair of clamping devices, fluid pressure-operated means on said base for imparting reciprocal movements to said slide, and means for imparting swinging movements to said hingedly mounted clamping jaws when same are brought into closely-spaced relation with the other pair of clamping devices.

6. The structure defined in claim 5 in which the pair of clamping devices having the hingedly mounted clamping jaws are carried by the slide, and in further combination with cam-actuated throw-out means associated with said hingedly mounted jaws operative to automatically remove the severed leg portions with the tendons thereof from said clamping jaws when said slide approaches the end of its clamping device retracting stroke.

7. In a poultry tendon-pulling machine, a mounting base, a pair of upstanding laterally-spaced leg engaging and clamping devices on said base, a slide, guide means mounting said slide on said base for advancing and retracting movements thereof toward and away from said clamping devices, a pair of leg engaging and clamping devices on said slide opposed to and aligned with the clamping devices on said base, each of said clamping devices comprising a pair of clamping jaws which are hingedly mounted adjacent their outer edges on parallel axes for gate-like swinging movements of their free edges from a clamping position wherein their free clamping edges define a V to an open position in a direction away from the opposed clamping devices, means limiting movement of said clamping jaws in the direction of the opposed clamping devices beyond a clamping position, and means for imparting opening swinging movements to said clamping jaws when said opposed pairs of clamping devices are brought into closely-spaced relationship to each other, said last-mentioned means comprising pusher elements mounted for common movements with said slide and engageable with one jaw of each pair thereof.

8. The structure defined in claim 7, in further combination with a horizontal rock shaft on said slide rearwardly of said clamping devices, said rock shaft extending transversely of the direction of movement of said slide and being provided with a pair of rocker arms one each of which is receivable under the action of gravity between said clamping jaws, a depending actuator arm on said rock shaft and a cam element on said base in the path of travel of said actuator arm adapted to impart throw-out movements to said rocker arm when said slide has been moved a predetermined distance from the clamping devices on said base, whereby to automatically remove the severed leg portions with the tendons thereof from the adjacent jaws.

9. The structure defined in claim 7 in which said rocker arms pass between the clamping jaws on said slide and are provided with T-shaped throw-out heads inwardly of said jaws.

10. The structure defined in claim 7 in which the clamping jaws on the base extend upwardly and outwardly in one direction and the clamping jaws on the slide project upwardly and outwardly in the opposite direction.

11. The structure defined in claim 7 in which each clamping jaw of each pair is provided with means for causing opening and closing movements to be imparted to its cooperating clamping jaw when opening or closing movements are imparted thereto, said means comprising a plurality of fingers one each of which projects laterally from a different one of said clamping jaws into the path of swinging movement of the clamping jaw cooperating with said one thereof.

References Cited in the file of this patent

UNITED STATES PATENTS

| Number | Name | Date |
| --- | --- | --- |
| 451,182 | Gaillac | Apr. 28, 1891 |
| 706,853 | Scannell | Aug. 12, 1902 |
| 1,521,472 | Philippe, Sr. | Dec. 30, 1924 |
| 1,707,123 | Keck | Mar. 26, 1929 |
| 2,482,950 | Toftey | Sept. 27, 1949 |

FOREIGN PATENTS

| Number | Country | Date |
| --- | --- | --- |
| 4,695 | Great Britain | 1892 |